(12) United States Patent
Yamazato

(10) Patent No.: US 11,403,524 B2
(45) Date of Patent: Aug. 2, 2022

(54) METHODS OF INCREASING PROCESSING SPEED IN A PROCESSING SYSTEM THAT PERFORMS A NONLINEAR OPTIMIZATION ROUTINE

(71) Applicant: Toru Yamazato, Okinawa (JP)

(72) Inventor: Toru Yamazato, Okinawa (JP)

(*) Notice: Subject to any disclaimer, the term of this patent is extended or adjusted under 35 U.S.C. 154(b) by 484 days.

(21) Appl. No.: 16/687,079

(22) Filed: Nov. 18, 2019

(65) Prior Publication Data

US 2020/0082267 A1 Mar. 12, 2020

Related U.S. Application Data

(63) Continuation-in-part of application No. 15/136,314, filed on Apr. 22, 2016, now abandoned.

(30) Foreign Application Priority Data

Apr. 30, 2015 (JP) .................................. 2015-093324

(51) Int. Cl.
| | | |
|---|---|---|
| *G06N 3/08* | (2006.01) | |
| *G06F 17/17* | (2006.01) | |
| *G05D 1/02* | (2020.01) | |
| *G05D 1/00* | (2006.01) | |
| *G06N 3/04* | (2006.01) | |

(52) U.S. Cl.
CPC ............ *G06N 3/08* (2013.01); *G05D 1/0088* (2013.01); *G05D 1/0221* (2013.01); *G06F 17/17* (2013.01); *G06N 3/04* (2013.01)

(58) Field of Classification Search
CPC .......... G06N 3/08; G06N 3/04; G05D 1/0088; G05D 1/0221; G06F 17/17
See application file for complete search history.

(56) References Cited

U.S. PATENT DOCUMENTS

2015/0301208 A1 10/2015 Lewis et al.

FOREIGN PATENT DOCUMENTS

JP          3845029          8/2006

OTHER PUBLICATIONS

Gordon, et al., "Generalized gradient descent", Mar. 2015, pp. 26, https://www.cs.cmu.edu/~ggordon/10725-F12/slides/08-general-gd.pdf.

*Primary Examiner* — Anne Marie Antonucci
*Assistant Examiner* — Jingli Wang
(74) *Attorney, Agent, or Firm* — Hamre, Schumann, Mueller & Larson, P.C.

(57) ABSTRACT

A method of increasing the processing speed of a computer having a computer processing unit that executes a nonlinear optimization routine is described. A favorable approximation of the derivative f'(x+αd) at the critical point can be obtained by one differential calculation at each search step. As a result, when a large-scale nonlinear optimization problem requiring a large amount of calculations is processed, $m_k$ at each search step is reduced and consequently the calculation time T is reduced significantly.

10 Claims, 8 Drawing Sheets fig.1 - PRIOR ART

A surface of a two dimensional function f(x) and an optimal x that makes f(x) minimal.

fig.2 - PRIOR ART

An example of a trajectory of x when solving
the minimization problem shown in Fig.1.

fig.3 - PRIOR ART

METHODS OF INCREASING PROCESSING SPEED IN A PROCESSING SYSTEM THAT PERFORMS A NONLINEAR OPTIMIZATION ROUTINE

CROSS-REFERENCE TO RELATED APPLICATION

The present application is based on and claims the benefit of priority of Japanese Priority Application No. 2015-93324 filed on Apr. 30, 2015, and the entire contents of which are hereby incorporated by reference.

FIELD

This disclosure relates to a processing system that has a processing program for executing a search process of determining a minimum or a maximum of a function f based on a line search method and that performs nonlinear optimization by causing a computer to operate using the processing program, to a nonlinear optimization method, and to a non-transitory computer readable medium recording the processing program thereon.

BACKGROUND

Finding a set of optimal values is an important technology for machine learning systems including neural networks, solver systems such as numerical analysis system, operations research system, structural calculation system, design simulation system and analysis system of fluid, heat, electromagnetic waves, etc., and for many other computer systems such as control systems. In an area of artificial intelligence, the machine learning is applied to intelligent systems such as recognition systems for hand-written characters or human faces, and forecasting systems for demand of water or electrical power. The set of the values is considered as a vector. To find the optimal values for above systems, a computer system iteratively improves a given arbitrary vector $x_0$ consisting of the values to be optimized, step by step.

To optimize the values the systems typically evaluate a function f(x) that represents a degree of optimality or an error from the optimality of x. For example, f(x) represents a total profit according to x storing amounts of stocked items, or an error rate of a face recognition system using internal parameters stored in x. Then, the system iteratively changes x to maximize or minimize f(x) depending on what it represents. This process is called a nonlinear optimization. If a vector $x_*$ makes $f(x_*)$ a minimum or a maximum, then $x_*$ is a vector that holds optimal values and is called an optimum solution. Here, $f(x_*)$ can be a local minimum or a local maximum. A conventional processing method for performing nonlinear optimization to compute an optimum solution $x_*$ is known.

A processing system that performs nonlinear optimization for a function f(x), using such a method, adopts an iterative method. The iterative method is a method by which $x_k$ is changed step by step from its initial value $x_0$ until a target optimum solution $x_*$ is obtained. At each step of the iterative method, a specific method is taken to determine a search direction vector d representing a certain direction, determine a scalar value a that makes a functional value $f(x_k+\alpha d)$ at a point $x_k+\alpha d$ given by changing x linearly along d the minimum or maximum on the line for the linear change, and determine $x_k+\alpha d$ to be a starting point $x_{k+1}$ for the next step. This method of determining $\alpha$ is referred to as line search.

A conventional processing system that performs nonlinear optimization needs to carry out calculations on the nonlinear function f(x) and its first derivatives (gradients) several times for determining $\alpha$ at each step of the iterative method. When practical problems in the above systems are solved, such calculations require an enormous processing time. For this reason, a means for reducing an amount of calculations at each step of the iterative method, thus reducing a time required for the whole processing, has been expected for years.

Japanese Patent No. 3845029 describes a technique related to a nonlinear optimum solution search apparatus that uses a computer having a processing program functioning as a bracketing means that by selectively using multiple increasing/decreasing coefficients, determines a section including the minimum (or the maximum) of a function f while changing a step size $\alpha$ and as a minimum search means (maximum search means) that carries out calculation of the minimum in the section (or the maximum), reduces iterative processes executed during line search and effectively searches for a nonlinear optimum solution.

This technique has led to a processing system that performs nonlinear optimization at a processing speed faster than that of a processing system that performs nonlinear optimization using a conventional bracketing means and optimum solution search means.

Patent Document 1: Japanese Patent No. 3845029

SUMMARY

A calculation time required by a processing system that performs nonlinear optimization will be described in a formulated manner. To solve a nonlinear optimization problem, usually a gradient method is used. A gradient is the first order derivative of a multidimensional function f(x), which represents the steepest slope at a point x. The gradient method starts at an arbitrary point $x_0$ and takes iterative steps to reach an optimum solution $x_*$ that makes $f(x_*)$ a (local) minimum (or maximum). A well-known example of the gradient method is the conjugate gradient method. A calculation time T required by a processing system that performs nonlinear optimization using the conjugate gradient method will be formulated using an expression (1), where $\Phi_1$ denotes a constant representing a calculation time for calculations other than iterated sections, N denotes the number of iterations, $m_k$ denotes the number of times of calculations on a function f and its derivatives (hereinafter "calculation amount") necessary for line search at one iterative step (hereinafter "search step"), $\tau$ denotes a time required for the calculations on the function f and its derivatives, and $\Phi_2$ denotes a time required for other calculations during line search. In dealing with a large-scale optimization problem, $\tau$ becomes extremely large, compared to $\Phi_2$ and $\Phi_1$. To reduce T, therefore, N and $m_k$ should be taken into consideration.

[Exp. 1]

$$T = \phi_1 + \sum_{k}^{N} (m_k \tau + \phi_2) \quad (1)$$

In a case where all search direction vectors $d_k$ are assumed to be conjugate to a positive definite Hessian matrix of the function f, the number of iterations N becomes equal to the number of dimensions n of x, according to the theoretical principle of the conjugate gradient method. In general, however, the search direction vectors $d_k$ are not exactly conjugate, and sufficiently minimizing f requires execution of n or more iterative steps. For this reason, the iterative steps are usually ended based on certain convergence conditions. If an exact step size $\alpha_k$ is calculated at each search step, an exact search direction vector $d_{k+1}$ is calculated at the next search step k+1. This means that calculating the exact step size $\alpha_k$ leads to a reduction in the number of iterations N.

However, an excessive demand for the exactness of the step size $\alpha$ leads to a need of an increase in the calculation amount $m_k$ at each search step, in which case the calculation time T for the processing increases. It is therefore concluded that in the case of a large-scale nonlinear optimization problem in which $\tau$ becomes extremely large, trying to reduce the calculation time T by pursuing the exact step size $\alpha_k$ is not a realistic approach.

Japanese Patent No. 3845029 describes a processing method for nonlinear optimization problems which method improves bracketing minimum (maximum) efficiency, thereby reducing $m_k$ to increase a processing speed, compared to a conventional processing method for nonlinear optimization problems using the bracketing method. The technique described in Japanese Patent No. 3845029 achieves more efficient bracketing but still requires multiple times of calculations on the function and its derivatives at each search step. To increase the processing speed, therefore, $m_k$ must be further reduced.

For the above reasons, shortening the calculation time T for the processing not by reducing the number of iterations N but by reducing $m_k$ at each search step to the minimum has been considered. One method of increasing the processing speed by reducing $m_k$ is known as a processing method for nonlinear optimization problems using a gradient method involving line search based on parabolic approximation (hereinafter "conventional processing method for nonlinear optimization problems).

The conventional processing method for nonlinear optimization problems is a method that regards functional values on a searched line as a quadratic function with respect to a step size and determines a step size up to a critical point at which a functional value becomes the minimum or maximum to be $\alpha$, based on functional values and derivatives at multiple points on the line. This processing method allows $\alpha$ to be determined with less calculation amount $m_k$ and is therefore provided as a processing method for nonlinear optimization problems that significantly reduces the calculation amount $m_k$ at each search step to increase the processing speed.

However, the conventional processing method for nonlinear optimization problems as described above still needs multiple times of calculations on the function and its derivatives at each search step, which is the main factor for increasing the calculation time T for the processing. Hence a processing system that further reduces $m_k$ to perform nonlinear optimization with a higher processing speed has been expected for long time.

A nonlinear optimization method is described herein that increases the speed of calculating a nonlinear optimum solution by making a calculation process at each search step efficient. A processing system that performs nonlinear optimization and a non-transitory computer readable medium recording a processing program thereon are also described.

The techniques described herein can be carried out in various forms, such as methods, systems, devices, and apparatuses (including graphical user interfaces and computer-readable media).

In order to solve the above problems, a processing system that performs nonlinear optimization is described. The processing system comprises a memory unit storing therein a processing program for causing a computer to function as a search means that, based on a line search method for calculating a step size $\alpha$ at each search step through parabolic approximation, repeats a process of proceeding from a reference point, which is a known current critical point, in the direction of a search direction vector by the step size $\alpha$ for determining an unknown critical point at the search step, thereby determines a minimum or maximum of a function f, and a processing unit that searches for a nonlinear optimum solution to the function f, using the processing program. The search means includes an initial information obtaining means that stores an arbitrary reference point $x_0$ as an initial value, in the memory unit, and a critical point approximating means that at a search step at which a critical point is searched for from a certain reference point, approximates a step size $\alpha$ up to the critical point, using a first-order derivative f'(x) at the reference point and the search direction vector d, the critical point approximating means also approximating a first-order derivative f'(x+$\alpha$d) at the critical point and storing the approximated step size $\alpha$ and first-order derivative f'(x+$\alpha$d) in the memory unit. The critical point is determined to be the next reference point and the first-order derivative f'(x+$\alpha$d) of the function approximated by the critical point approximating means is determined to be a first-order derivative of the function at the next reference point to carry out nonlinear optimization at the next reference point.

In this configuration, a favorable approximation of the derivative f'(x+$\alpha$d) at the critical point can be obtained by only one differential calculation at each search step. As a result, when a large-scale nonlinear optimization problem requiring a large amount of calculations is processed, $m_k$ at each search step is reduced and consequently the calculation time T is reduced significantly, compared to the conventional case.

According to one embodiment, the search means includes a temporary critical point memory means that at a search step at which a critical point is searched for from a certain reference point, determines a first-order derivative f'(x+$\sigma$d) at a temporary critical point reached by proceeding from the reference point in the direction of the search direction vector d by a temporary step size $\sigma$, which is a minute none-zero scalar value, and that stores the first-order derivative f'(x+$\sigma$d) in the memory unit. The critical point approximating means approximates the first-order derivative f'(x+$\alpha$d) at the critical point, using the first-order derivative f'(x) at the reference point, the first-order derivative f'(x+$\sigma$d) at the temporary critical point, the temporary step size $\sigma$, and the step size $\alpha$.

According to an embodiment, the step size $\alpha$ is determined by calculation using a second-order derivative approximated by a finite difference approximation method, with respect to a quadratic function of $\alpha$, given by a functional value f(x+$\alpha$d) approximated to a parabola by proceeding in a direction of the search direction vector d by $\alpha$.

According to an embodiment, the critical point approximating means approximates the functional value f(x+$\alpha$d) at the critical point, using the second-order derivative.

According to an embodiment, the initial information obtaining means stores a convergence criterion ω for convergence test in the memory unit, and the search means includes a judging means that judges whether a convergence condition is satisfied or not using the convergence criterion ω and the first-order derivative f'(x+αd) at the critical point. When the judging means judges that convergence does not occur, the temporary critical point memory means and the critical point approximating means determine a calculated critical point to be a new reference point and carry out a process for next search step at which an unknown critical point is searched for.

The term "convergence condition" described hereinafter means a condition where x is sufficiently optimized for a purpose of the nonlinear optimization. Here, "sufficiently" means that x is optimized so that a function using x outputs a value within a desirable range. For example, x is sufficiently optimized when a function value of x, f(x), or a gradient of f(x), or a function value determined by those values of different optimization steps is more or less than a predefined value, ω, where f(x) is a function of x. In other cases, x is sufficiently optimized when the number of the optimization steps repeated exceeds a predefined number, ω. Any other metrics indicating sufficiency of the optimization are possible to determine whether x is sufficiently optimized. This means that the convergence criterion ω can be any value that determines convergence, which indicates the end of iterating search steps. For example, a convergence can be determined when the value of f(x+αd) or L2 norm of f'(x+αd) is less than a value, ω. Many other metrics are possible to be compared with ω to determine whether a convergence condition is satisfied or not. For example, the number of repeating search steps or, in case of a neural network training explained later, an accuracy of prediction can be compared with a value ω to determine the end of repetition.

According to an embodiment, at each search step, the search means judges whether or not to adopt one or more approximations calculated by the critical point approximating means. When not adopting the approximation at the search step, the search means replaces a value calculated as the approximation with a directly calculated value determined by direct calculation.

In this configuration, compared to a case where all approximations are adopted for calculating an optimum solution, more stable processing is achieved.

According to an embodiment, the search means judges validity of convergence, using one or more of values calculated at each search step.

When a preset condition is not met, the search means traces back search steps by one or more steps to reach a preceding search step, at which the search means replaces an approximation calculated by the critical point approximating means with a directly calculated value determined by direct calculation.

According to an embodiment, the search means uses a gradient method.

This configuration provides a processing system that performs nonlinear optimization of searching for a minimum or maximum of the function f using the gradient method.

According to an embodiment, the search means stores at least calculated values calculated at a series of preceding search steps one step before the current search step, the first-order derivative f'(x+σd), and the first-order derivative f'(x+αd), in the memory unit.

This configuration provides a processing system that performs nonlinear optimization allowing fast iterative processing.

The described embodiments provide a machine learning method according to which a learning process is executed based on training data, using the processing system that performs nonlinear optimization.

In this configuration, in a machine learning process of learning functional approximation, classification, etc., by carrying out calculations on a large volume of training data at each search step and searching for an optimum solution, the number of times of calculations at each search step can be reduced to the minimum. As a result, a machine learning method that significantly increases a learning speed is provided.

The described embodiments also provide a learning method for an artificial neural network according to which method a learning process is executed through error function minimization based on training data, using the processing system that performs nonlinear optimization.

A neural network consists of multiple layers containing multiple "neurons", each of which connects to neurons in a preceding layer via a "synapse" having a "weight" or a parameter, which is a value designating a degree of influence of the source neuron to the destination neuron. In a neuron, the inputs are summed, a bias is added, and inputted to an activation function, which is a nonlinear function that yields an output of the neuron. The output of the neuron is multiplied by the weights of the synapses and inputted to neurons in the following layer. A neuron does not have to be connected to all the neurons in the preceding layer. Further, the connection can skip one or more layers, and an output can return to a previous layer. Usually, a useful neural network requires a very large number of connections.

The most preceding layer of a neural network accepts an input of the whole network, which can be, for example, a pixel value of a picture captured by a camera of an automated vehicle. The input data propagate to intermediate layers. Each of the intermediate layers consisting of the neurons using the parameters converts the input data into intermediate data propagating to the following layer. At this stage, the parameters determine the conversion and output of the final layer. Finally, the final layer outputs one or more values that the neural network is constructed for, via an output function. For example, the output can be a result of classification that determines what is captured by the camera, or a predicted value of steering angle or speed for driving control of the automated vehicle. In the example, updating the parameters fast and accurately achieves a favorable automated driving control to a great extent.

If a set of test data are given, an accuracy of a neural network is calculated as a ratio of the number of correct output and total number of the given data. The test data consists of pairs of an input and a desirable (correct) output. Another way to measure a performance of a neural network is a "loss" function calculated according to a set of data consisting of the correct output and the actual output corresponding to an input. The output of a neural network is determined by the input and the parameters. Therefore, in order to make the neural network yield the correct output, the parameters must be adjusted, or "trained". The training, or "learning" is performed so that the value of the loss function is minimized. Because the loss function is a multivariable nonlinear function of the parameters, the learning process is a nonlinear optimization over the parameters. In order to train a neural network, a large number of pairs of input and desirable output are given as training data and used repeatedly, resulting in a tremendous number of calculations even for one gradient.

In this configuration, in a learning process by an artificial neural network that requires calculation on a large volume of training data and search for an optimum solution, the number of times of calculations at each search step is reduced to the minimum. As a result, an artificial neural network with a significantly increased learning speed is constructed.

The described embodiments also provide a non-transitory computer readable medium recording thereon a processing program for causing a computer to function as a search means that based on a line search method for calculating a step size α at each search step through parabolic approximation, repeats a process of proceeding from a reference point, which is a known current critical point, in the direction of a search direction vector d by the step size α for determining an unknown critical point at the search step, thereby determines a minimum or maximum of a function f. The search means includes an initial information obtaining means that stores an arbitrary reference point $x_0$ as an initial value, in the memory unit, and a critical point approximating means that at a search step at which a critical point is searched for from a certain reference point, approximates the step size α up to the critical point, using a first-order derivative f'(x) at the reference point and the search direction vector d, the critical point approximating means also approximating a first-order derivative f'(x+αd) at the critical point and storing the approximated step size α and first-order derivative f'(x+αd) in the memory unit. The search means determines the critical point to be the next reference point and determines the first-order derivative f'(x+αd) of the function approximated by the critical point approximating means to be a first-order derivative of the function at the next reference point to carry out nonlinear optimization at the next reference point.

As used herein, the critical point approximating means, the temporary critical point memory means, the judging means, the initial information obtaining means, and the search means can be realized by hardware, such as a processing unit, processing software, and combinations thereof.

The described embodiments also provide a nonlinear optimization method according to which, based on a line search method for calculating a step size α at each search step through parabolic approximation, a process of proceeding from a reference point, which is a known current critical point, in the direction of a search direction vector by the step size α for determining an unknown critical point at the search step is repeated to determine a minimum or maximum of a function f. According to the method, an arbitrary reference point $x_0$ is stored as an initial value in the memory unit, and at a search step at which a critical point is searched for from a certain reference point, the step size α up to the critical point is approximated using a first-order derivative f'(x) at the reference point and the search direction vector d, a first-order derivative f'(x+αd) at the critical point is also approximated, and the approximated step size α and first-order derivative f'(x+αd) are stored in the memory unit. The critical point is determined to be the next reference point, and determining the approximated first-order derivative f'(x+αd) to be a first-order derivative of the function at the next reference point.

The described embodiments also provide a machine learning system that executes a learning process based on training data, using the nonlinear optimization method.

The described embodiments also provide an artificial neural network system that carries out error function minimization based on training data, thereby executing a learning process, using the nonlinear optimization method.

One embodiment provides a nonlinear optimization method that improves the speed of calculating a nonlinear optimum solution by increasing the efficiency of a calculation process at each search step to the maximum, a processing system that performs nonlinear optimization, and a non-transitory computer readable medium storing a processing program thereon.

BRIEF DESCRIPTIONS OF THE DRAWINGS

DETAILED DESCRIPTION

First Embodiment

Figure 1:
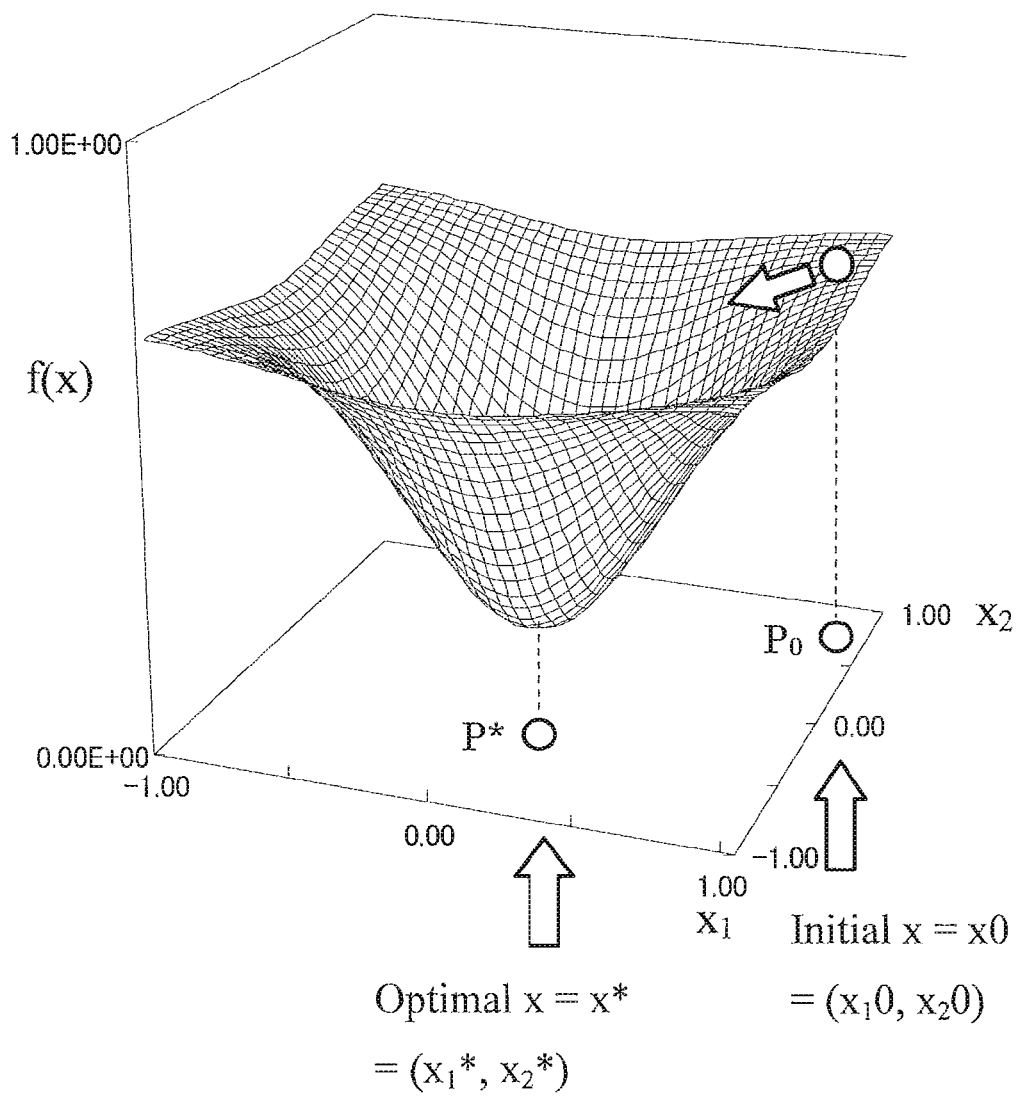
FIG. 1 depicts an example of a nonlinear optimization problem.
Figure 2:
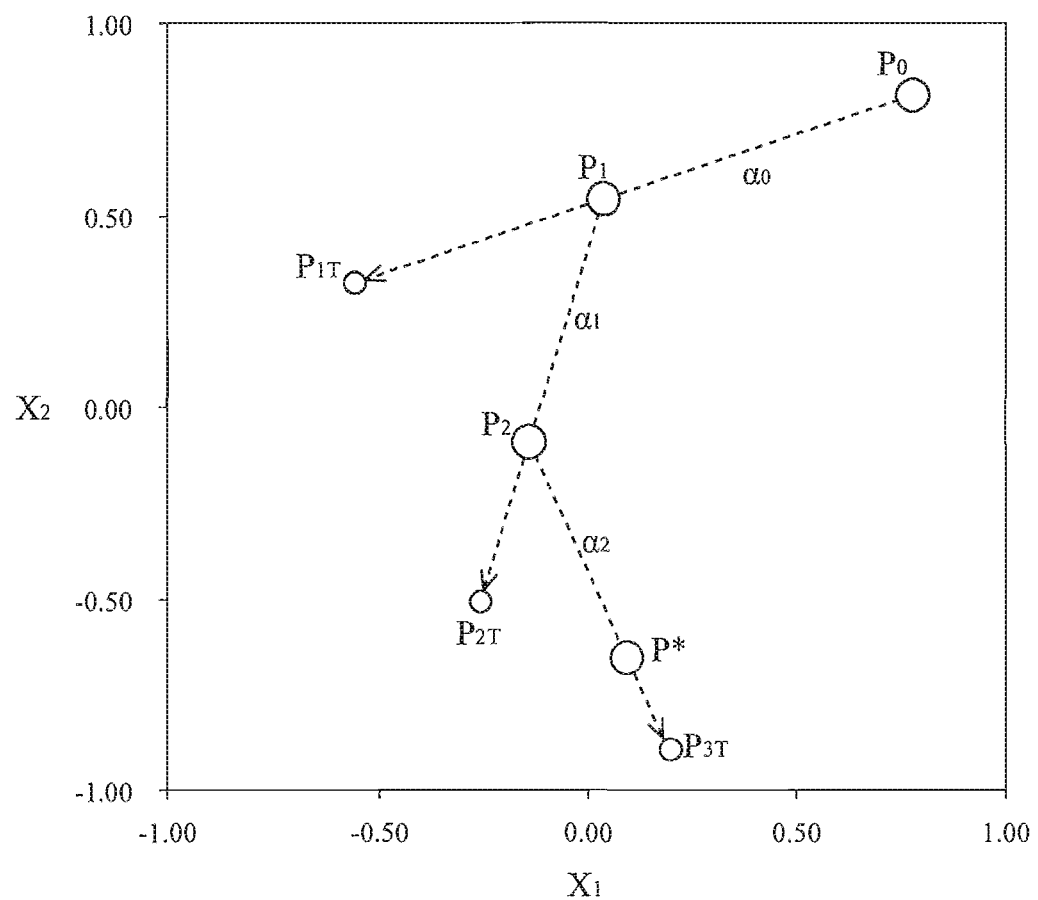
FIG. 2 shows steps plotted on a two dimensional plain of x in FIG. 1.

A first embodiment will hereinafter be described, referring to FIGS. 4 to 5 along with FIG. 1 to FIG. 3 which illustrates a conventional process. Configurations described in the following embodiment are examples, and the claimed invention is not limited to those configurations of the described embodiments. The outline of the first embodiment will be described, using a conjugate gradient method. The first embodiment applies also to nonlinear optimization problem solution algorithms other than the conjugate gradient method, and a processing system that performs nonlinear optimization according to the first embodiment using such nonlinear optimization problem solution algorithms may also be configured.

(1) Explanation of Conjugate Gradient Method

The conjugate gradient method will first be explained. Minimization of f(x) will be explained in the following description, in which the same method applied to minimization of f(x) can also be applied to maximization of f(x). This embodiment will be described using the conjugate gradient method as a nonlinear optimization problem solution algorithm.

An optimum solution $x_*$ to an unconstrained nonlinear optimization problem in application of the conjugate gradient method is calculated in general by applying an iterative method represented by an expression (3) to an expression (2). An expression (4) gives a search direction vector d by using the conjugate gradient method. In a nonlinear optimization problem, the objective function f is usually a multivariable function. $x_k$ and $d_k$, therefore, each denotes a multidimensional vector in the k-th iteration. For example, if $x_k$ is an n dimensional vector, $x_k=(v_1, v_2, v_3, \ldots v_n)_k$ consists of values $v_i(1 \le i \le n)$. In the expression (4), $g_k$ represents the gradient of the function f; i.e. $g_k = \nabla f(x_k) = (\partial f/\partial v_1, \partial f/\partial v_2, \partial f/\partial v_3, \ldots, \partial f/\partial v_n)_k$. Differential defined in this disclosure thus includes not only differential in a one-dimensional domain but also differential in a multidimensional domain, i.e. gradient calculation. For example, $f'(x_k)$ represents $\nabla f(x_k)$. A step size $\alpha_k$ is a scalar value.

[Exp. 2]
$$\min f(x), x \in R^n \qquad (2)$$

[Exp. 3]
$$x_{k+1} = x_k + \alpha_k d_k \qquad (3)$$

[Exp. 4]
$$d_k = \begin{cases} -g_k & \text{for } k=0 \\ -g_k + \beta_k d_{k-1} & \text{for } k>0 \end{cases} \qquad (4)$$

According to the gradient method, each of repeated process steps is defined as a search step and a point used as a point of reference to search at each search step is defined as a reference point. The optimum solution $x_*$ is calculated while a critical point that gives the minimum (maximum in the case of a maximization problem) of a one-dimensional quadratic function including the reference point is searched for at each search step. An initial reference point is given arbitrarily as $x_0$, and $x_1$ that is searched for based on the reference point $x_0$ is determined to be an initial critical point. Critical points include a critical point determined approximately as a strictly-defined critical point on the one-dimensional quadratic function.

A critical point $x_{k+1}$ calculated at each search step k by the gradient method is subjected to convergence test using a derivative $f'(x_{k+1})$ of the function f at the critical point and a convergence criterion $\omega$. When the critical point $x_{k+1}$ is judged to be a convergence point by the convergence test, the critical point $x_{k+1}$ is determined to be the optimum solution $x_*$. When the critical point $x_{k+1}$ is judged to be a non-convergence point, the calculated critical point $x_{k+1}$ is determined to be a new reference point, based on which a search step k+1 for finding an unknown critical point $x_{k+2}$ is started. The convergence test may be carried out by any given method. For example, the convergence test may be carried out using not a derivative but a functional value.

The search direction vector d of the expression (4) given by the conjugate gradient method is calculated by several methods, such as Fletcher-Reeves (FR), Hestenes-Stiefel (HS), Polak-Ribiere (PR), and Dai-Yuan (DY). In this embodiment, FR indicated by an expression (5) is used as a specific example of those calculation methods.

[Exp. 5]
$$\beta_k^{F-R} = \frac{g_k^T g_k}{g_{k-1}^T g_{k-1}} \qquad (5)$$

(2) Conventional Line Search Based on Parabolic Approximation

Conventional line search based on parabolic approximation will now be described. In this embodiment, a parabolic interpolation method is used as a parabolic approximation algorithm. If an exact step size $\alpha_k$ is given at each search step, exact $d_{k+1}$ that, in theory, sets an ideal search direction is given, in which case early convergence results (reduction in the number of iterations N). Enhancing the precision of the line search in dealing with an actual large-scale optimization problem, however, leads to repeated calculations of too many functions and gradients, thus resulting in an increase in a calculation time T, which is not a realistic approach (increase in $m_k$). For this reason, a method for efficiently determining the step size $\alpha_k$ is applied in general.

A functional value $f(x+\alpha d)$ at a point $x+\alpha d$ can be approximated by Taylor expansion, as indicated by an expression (6). $f'(x) = \nabla f(x)$ represents the gradient of the function f, and $f''(x)$ represents a Hessian matrix.

[Exp. 6]
$$f(x+\alpha d) \approx f(x) + \alpha [f'(x)]^T d + \frac{\alpha^2}{2} d^T f''(x) d \qquad (6)$$

The right-hand member of the expression (6) expresses a parabola, that is, one-dimensional quadratic function with an independent variable $\alpha$. From this approximate expression (6), subjecting $f(x+\alpha d)$ to first-order differential and second-order differential with respect to a yields expressions (7) and (8). To determine a critical point, the left-hand member of the equation (7) is set equal to zero and is solved with respect to $\alpha$. This gives an expression (9), in which $\alpha_*$ denotes a step size up to the critical point on the quadratic function.

[Exp. 7]
$$\frac{d}{d\alpha} f(x+\alpha d) \approx [f'(x)]^T d + \alpha d^T f''(x) d \qquad (7)$$

[Exp. 8]
$$\frac{d^2}{d\alpha^2} f(x+\alpha d) \approx d^T f''(x) d \qquad (8)$$

[Exp. 9]
$$\alpha_* \approx -\frac{[f'(x)]^T d}{d^T f''(x) d} \qquad (9)$$

$f''(x)$ included in the denominator of the expression (9) is hard to calculate directly and takes an extremely long time for calculation. To avoid such a situation, an arbitrary minute non-zero value is determined to be a temporary step size G, and a first-order derivative of the function f is calculated at a reference point x and a temporary critical point $x+\sigma d$, which are different two points on the function f. In this manner, $d^T f''(x)d$ is approximated by a finite difference approximation method (expression (10)). The expression (10) is then substituted in the expression (9) to approximate $\alpha^*$ (expression (11)). Although $d^T f''(x)d$ is approximated by the finite difference approximation method in the expression (10), an approximation of $d^T f''(x)d$ may also be determined by another method.

When f represents a quadratic function, $f(x+\alpha d)$ represents an exact parabolic function of $\alpha$, and the step size $\alpha^*$ determined by the expression (9) takes a value exactly indicating the critical point. When the finite difference approximation method is used, the line search using the parabolic interpolation method satisfies in many cases strong Wolfe conditions at one calculation of α. As a result, at one calculation for determining the step size $α_k$, an optimum step size $α_{k*}$ at each search step is calculated with preferable precision.

[Exp. 10]

$$d^T f''(x)d \approx \frac{\frac{d}{d\sigma}f(x+\sigma d) - [f'(x)]^T d}{\sigma} = \frac{[f'(x+\sigma d)]^T d - [f'(x)]^T d}{\sigma} \quad (10)$$

[Exp. 11]

$$α_s \approx -\frac{\sigma[f'(x)]^T d}{[f'(x+\sigma d)]^T d - [f'(x)]^T d} \quad (11)$$

(3) Explanation of Conventional Processing Method for Nonlinear Optimization Problems A conventional processing method for nonlinear optimization problems will now be described, referring to FIG. 1 to FIG. 3. FIG. 1 depicts an example of the nonlinear optimization. The surface represents a function f with respect to a two dimensional variable x. FIG. 2 shows the steps plotted on the two dimensional plain of x in FIG. 1. The dimension can be thousands or more. A point $P_0$ represents the starting point and P* represents the optimum solution where f(x) is the minimum. The gradient method changes the value of x step by step to reach P* from $P_0$. The final output is the combination of values, $x_1$* and $x_2$*. The gradient and the function value at $P_0$ are known by the initialization step. The iterative steps of the prior art is as follows. First, $P_{1T}$ is reached by the temporary step size σ to compute the gradient at the point. Using the gradient at two points, $P_0$ and $P_{1T}$, a step size $α_0$ that makes $P_1$ a critical point, which is a minimum point along the line between $P_0$ and $P_{1T}$ is computed. Then, $P_1$ is turned into the starting point for the next step and the gradient at $P_1$ is computed directly. As above this procedure is repeated to find $P_2$ and P* is reached. Although P* is reached in 3 steps, the number of steps required in practical applications can be thousands or more. Gradients have to be computed twice in each step, hence, 6 times as total in this example of a conventional method.

Figure 3:
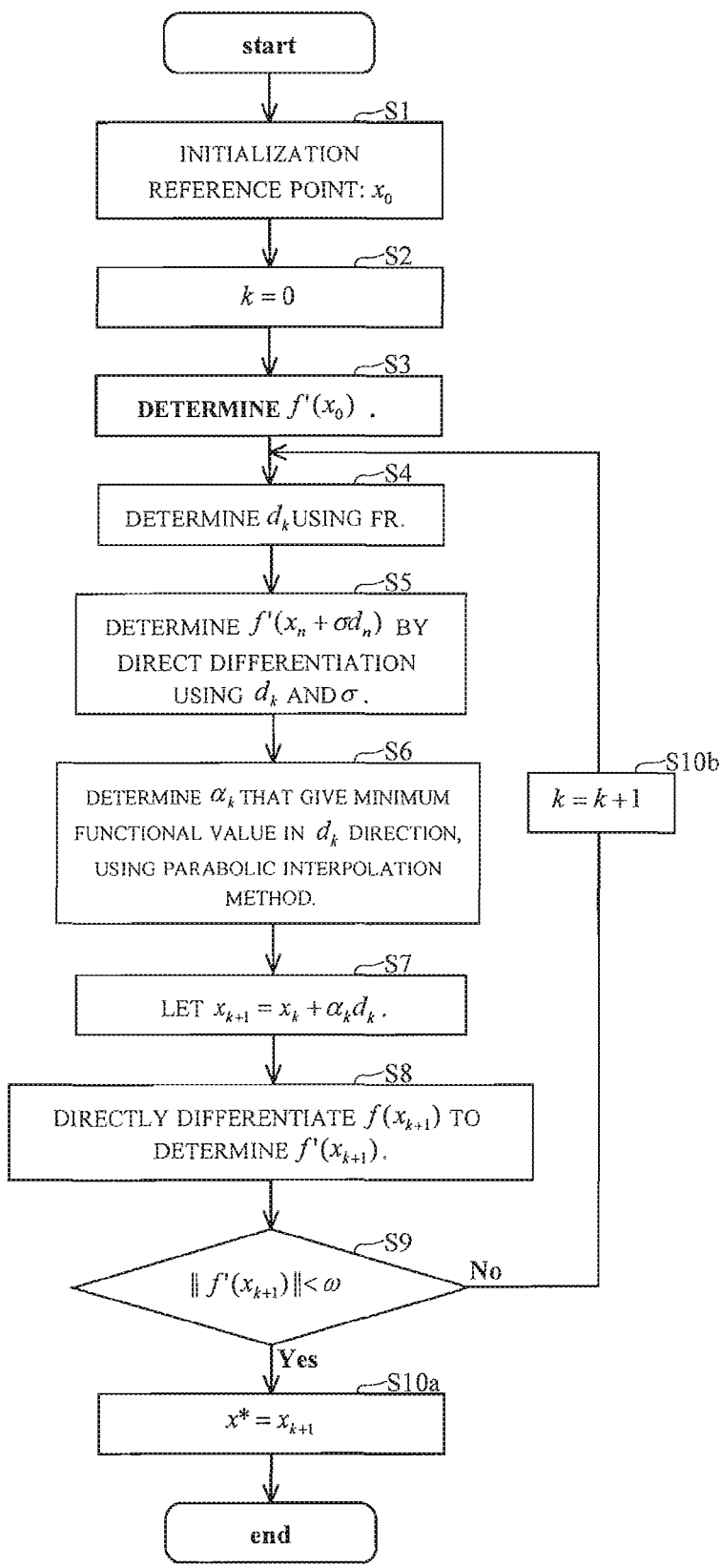
FIG. 3 is a conventional process flowchart for solving a nonlinear optimization problem.

FIG. 3 is a flowchart of the conventional process for solving a nonlinear optimization problem. At step 1 (S1), initialization according to the gradient method is carried out. A reference point $x_0$ for k=0 as well as a convergence criterion w and an arbitrary minute value σ, which are treated as initial information, are input, after which a search step for k=0 (calculation of a critical point $x_{k+1}$ and assessment of the calculation) is started (step 2 (S2)). At S3, $f(x_0)$ is differentiated to calculate $f'(x_0)$. The calculated $f'(x_0)$ is then applied to FR to determine a search direction vector $d_0$ (S4).

At S5, $f'(x_k+σd_k)$ is determined by direct differential calculation, using a search direction vector $d_k$ determined at S4. "direct differential calculation" means not only analytic differentiation but also automatic, symbolic, and numerical differentiation, and backpropagation. When $f'(x_k+σd_k)$ is determined, the value of a step size $α_k$ up to an unknown critical point is approximated, based on the parabolic interpolation method and finite difference approximation method (S6). A temporary step size $σ_k$ may be determined by calculating its preferred value at each search step.

Since $α_k$ and $d_k$ have been determined by the above steps, the unknown critical point is determined to be $x_{k+1}=x_k+α_k d_k$ (S7). A functional value $f(x_{k+1})$ at $x_{k+1}$ is then calculated by direct functional calculation. By directly differentiating $f(x_{k+1})$, the gradient $f'(x_{k+1})$ of the function f at $x_{k+1}$ is calculated (S8).

At S9, whether the gradient $f'(x_{k+1})$ of the function f at the critical point $x_{k+1}$ calculated at S8, has converged or not is judged, using the convergence criterion ω. When it is judged that the gradient $f'(x_{k+1})$ has converged (Yes at S9), $x_{k+1}$ is determined to be the optimum solution x* to the function f (S10a). When it is judged that the gradient $f'(x_{k+1})$ has not converged (No at S9), the value of k is increased by 1 at S10b and the process flow returns to S4, at which the next search step is started to calculate an unknown critical point $x_{k+2}$ with reference to the above calculated critical point $x_{k+1}$ determined to be a reference point. Thus, convergence assessment at S9 is continued as search steps are repeated until the convergence test determines convergence of the gradient $f'(x_{k+1})$. The convergence test at S9 may be carried out using a value other than the gradient of f, such as α or d.

(4) Explanation of Processing Method for Nonlinear Optimization Problems According to the First Embodiment Approximate line search and a processing method for nonlinear optimization problems according to the first embodiment will now be described, referring to FIG. 4. The same constituent elements as included in the above conventional processing method for nonlinear optimization problems will be omitted in further description. Steps S1 to S17 are the same as steps S1 to S7 of the conventional processing method depicted in the flowchart of FIG. 3.

According to the conventional processing method for nonlinear optimization problems depicted in FIG. 3, because of use of the finite difference approximation method indicated by the expression (10), direct differential calculation of $x_k+σd_k$ (S5) and of $x_{k+1}$ (S8) is necessary. This means that direct differential calculation on two points must be carried out at one search step.

The length of a calculation time T required for solving a nonlinear optimization problem depends on the number of iterations N and on the number of times $m_k$ of differential calculations and functional calculations carried out at each search step. Now, line search according to the first embodiment is applied at S18. This offers a processing method for nonlinear optimization problems that reduces the number of times of direct differential calculations at each search step, thereby reduces the calculation time T for the whole processing. In the first embodiment, exact gradients at $P_1$, $P_2$, and P* are not computed; instead, these gradients are approximated from known values at each step. Therefore, the exact gradients are directly computed only for $P_{1T}$, $P_{2T}$, and $P_{3T}$, and the number of gradient computation is reduced from 6 to 3 in the example described in FIG. 1 and FIG. 2. Because the computing exact gradient takes tremendous time for some applications, the reduction of computation time is large. The iteration may accumulate errors for the approximation, and the errors affect the path and number of steps to reach the solution. However, experiments indicated that the overall computation time of a program using the processing method for nonlinear optimization problems according to the first embodiment was near 50% of the conventional one.

In an assumed case where a Hessian matrix H is given, f'(x+αd) can be transformed into the right-hand member of an expression (12), where ε denotes an error term, which will be omitted in the following description on the assumption that f can be approximated sufficiently into a quadratic expression. By replacing a in the expression (12) with σ, Hd is expressed in the form of an approximate expression (13).

[Exp. 12]

$$f'(x + \alpha d) = f'(x) + \alpha H d + \varepsilon \tag{12}$$

[Exp. 13]

$$Hd \approx \frac{f'(x + \sigma d) - f'(x)}{\sigma} \tag{13}$$

Hd approximated by expression (13) is substituted in the expression (12) and α is replaced with ac, which yields an expression (14). Hence the value of f'(x+αd), which is determined by gradient calculation in the conventional case, is given by approximation. In the expression (14), f'(x) has already been calculated at the search step one step before the current search step and f'(x+σd) has been calculated at S15. Therefore, f'(x+αd), which represents differential calculation at a critical point at each search step, can be calculated recursively, using already calculated values. f'(x+αd) with a subscript k denoting the number of search steps is expressed in an expression (15), and a with a subscript k denoting the number of search steps is expressed in an expression (16).

[Exp. 14]

$$f'(x + \alpha_* d) \approx \frac{\alpha_*}{\sigma}[f'(x + \sigma d) - f'(x)] + f'(x) \tag{14}$$

[Exp. 15]

$$f'(x_{k+1}) = f'(x_k + \alpha_k d_k) = \frac{\alpha_k}{\sigma}[f'(x_k + \sigma d_k) - f'(x_k)] + f'(x_k) \tag{15}$$

[Exp. 16]

$$\alpha_k = -\frac{\sigma[f'(x_k)]^T d_k}{[f'(x_k + \sigma d_k)]^T d_k - [f'(x_k)]^T d_k} \tag{16}$$

As described above, because f'(x) has been calculated at the search step one step before the current search step and f'(x+σd) has been calculated when the step size α is determined using the finite difference approximation method, f'(x+αd) can be calculated very easily by a simple substitution procedure. This reduces the number of times of direct differential calculations at one search step to one, that is, one direct differential calculation of f'(x+σd). In the case of processing a large-scale nonlinear optimization problem, therefore, the calculation time T required for the processing is reduced significantly. Specifically, the number of times of differential calculations, which is at least two times or more at each search step in the conventional case, is reduced to one. However, determining the first-order derivative f'(x₀) at the search step for k=0 still requires direct differential calculation.

When f'(x_{k+1}) is approximated at S18, whether f'(x_{k+1}) converges or not is judged in the same manner as in the conventional case (S20). When it is judged that f'(x_{k+1}) has converged (Yes at S20), the critical point x_{k+1} is determined to be the optimum solution x_* to f (S21a). When it is judged that f'(x_{k+1}) has not converged (No at S20), the value of k is increased by 1 (S21b) and the process flow returns to S14, at which the next search step is started to calculate an unknown critical point x_{k+2} with reference to the above calculated critical point x_{k+1} determined to be a reference point. The convergence test at S20 may be carried out using a value other than the gradient of f, such as a functional value for f(x_{k+1}), α, or d.

When necessary, a functional value for f(x_{k+1}) may also be approximated during a series of steps of S18 to S20 (S19). As described above, the convergence test may be carried out using such an approximated functional value for f(x_{k+1}). This makes direct functional calculation on f(x_{k+1}) unnecessary, thus further reducing a time required for calculation at one search step. To determine a functional value for f(x_{k+1}) (=f(x_k+α_k d_k)) by approximation, an expression (17) is used, which is given by replacing x and a in the expression (6) with x+σd and α−σ, respectively.

[Exp. 17]

$$f(x + \alpha d) \approx \tag{17}$$
$$f(x + \sigma d) + (\alpha - \sigma)[f'(x + \sigma d)]^T d + \frac{(\alpha - \sigma)^2}{2} d^T f''(x + \sigma d) d$$
$$(\because f(x + \alpha d) = f(x + \sigma d + \alpha d - \sigma d))$$

To approximate $d^T f''(x+\sigma d) d$ in the expression (17), a minute non-zero value μ is given to the expression (17), which yields an expression (18). Now setting μ=−σ gives an expression (19).

[Exp. 18]

$$d^T f''(x + \sigma d) d \approx \frac{[f'(x + \sigma d + \mu d)]^T d - [f'(x + \sigma d)]^T d}{\mu} \tag{18}$$

[Exp. 19]

$$\text{Let } \mu = -\sigma, \text{ then } d^T f''(x + \sigma d) d \approx \frac{[f'(x + \sigma d)]^T d - [f'(x)]^T d}{\sigma} \tag{19}$$

Substituting the expression (19) in the expression (17) then results in an approximation of f(x_{k+1}). The right-hand member of the expression (19) is identical with the right-hand member of the expression (10) for approximating α. This means that a value for f(x_{k+1}) is not determined by direct functional calculation but by approximation using only the value already determined in the stage of calculating α_k. The amount of calculation is therefore reduced.

Obviously, determining f(x+αd) by direct functional calculation is by no means problematic, but such an approach increases the amount of calculation at each search step, thus increasing the calculation time T required for determining the optimum solution x_*. Depending on the configuration of a processing program to apply, f(x_k+σd_k) is calculated for determining f'(x_k+σd_k), in which case the number of times of calculations for approximating f(x_k+α_k d_k) does not increase.

Figure 4:
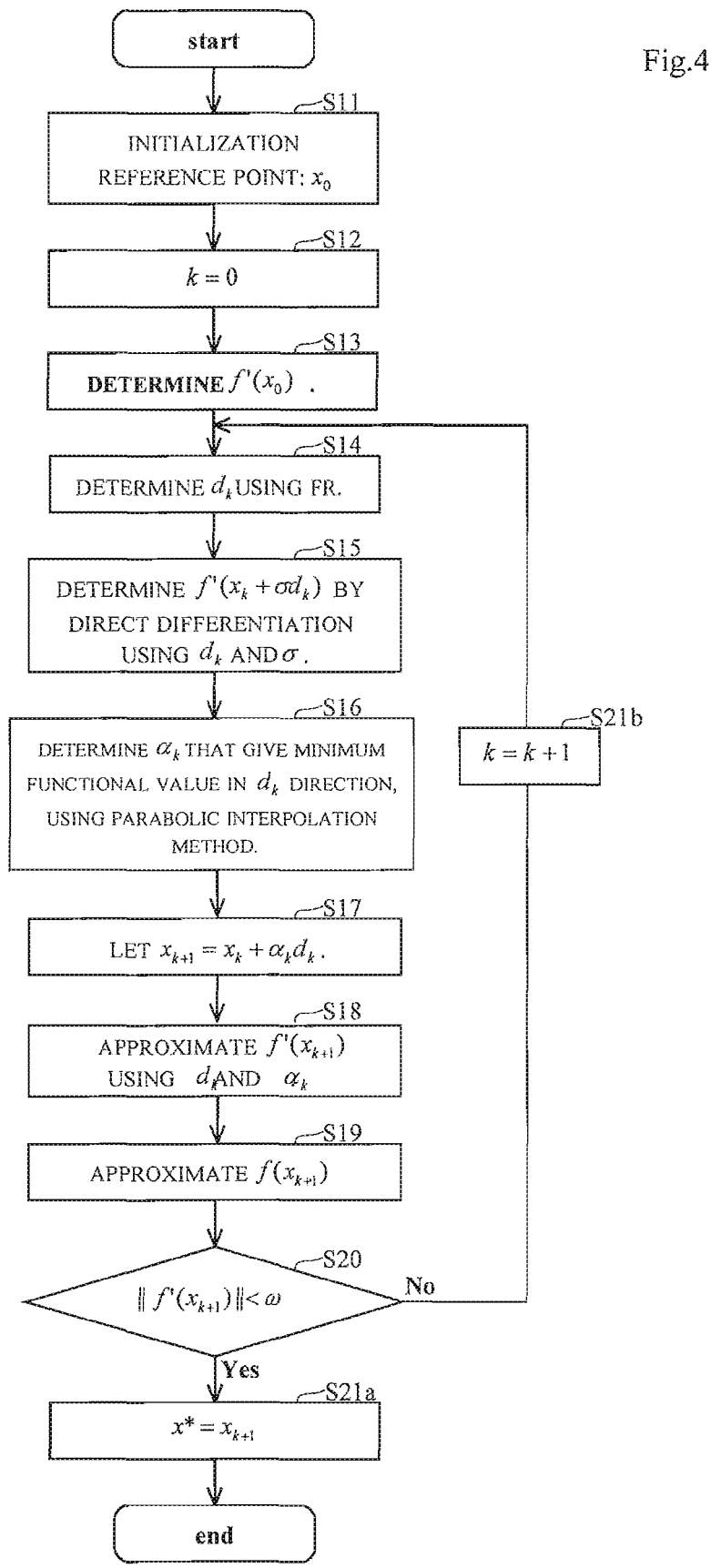
FIG. 4 is a process flowchart for a nonlinear optimization method according to a first embodiment described herein.
Figure 5:
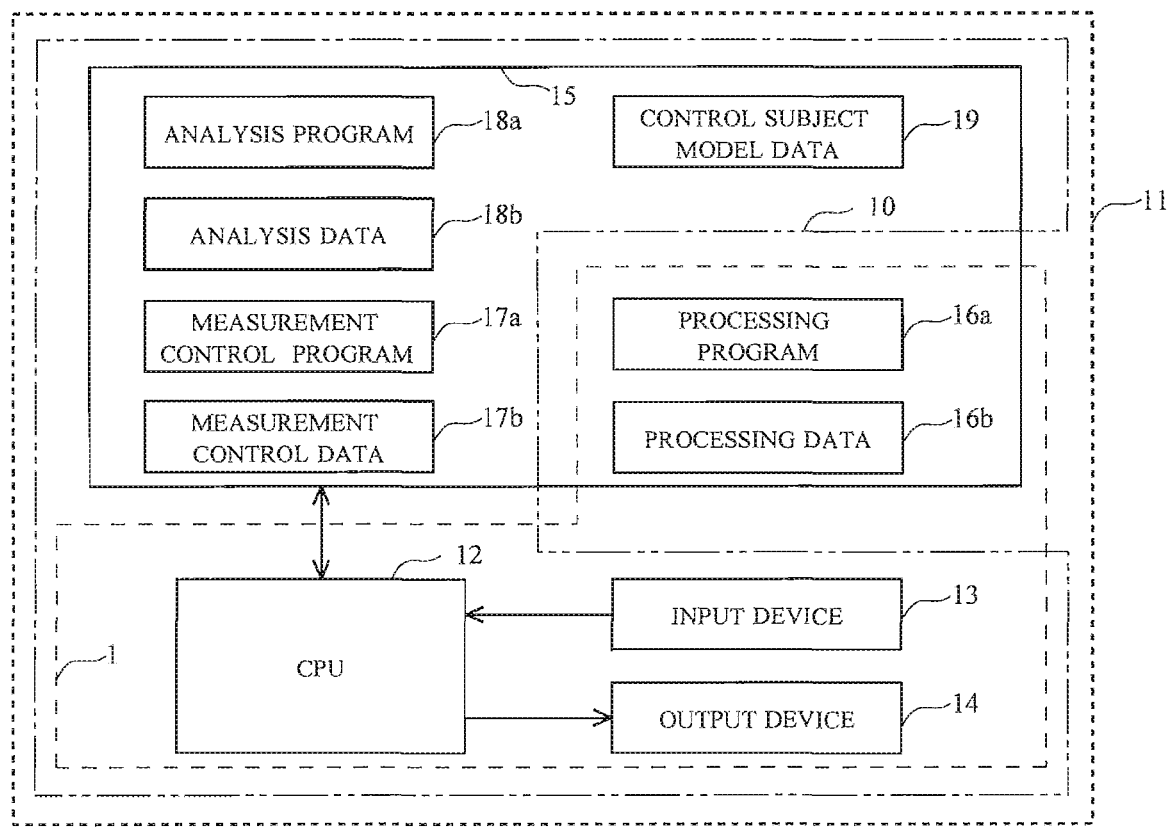
FIG. 5 depicts a hardware configuration of a processing system that performs nonlinear optimization according to the first embodiment.

The flowchart of FIG. 4 shows the case of applying the processing method for nonlinear optimization problems in which case search steps are repeated. Under an arbitrary condition, however, a different process may be introduced. For example, whether or not to adopt a calculated approximate value, such as the step size α, f'(x_k+α_k d_k), and f(x_k+α_k d_k), may be judged based on a preset condition and a process not included in the flowchart of FIG. 4 may be carried out according to the resulting judgment. When it is judged at a certain search step that such an approximate value is not adopted, for example, the approximate value may be replaced with a directly calculated value determined by direct calculation or a value determined by a different calculation method.

In another case, the validity of convergence may be judged using one or more of values obtained by the processing method for nonlinear optimization problems and the approximate value adoption judgment, and a process not included in the flowchart of FIG. 4 may be carried out according to the resulting judgment. In one embodiment, under a condition of $0<\alpha$ or $0<f(x_{k+1})<f(x_k)$, a case of a parabola used by the parabolic interpolation method being convex in the functional minimum search, a case of $f(x_{k+1})$ not converging, etc., can be identified and different processes be applied to such cases. Different processes include, for example, replacing the value of a calculated by approximation with a value calculated by a different method and replacing the value of $f'(x_{k+1})$ or $f(x_{k+1})$ calculated by approximation with a directly calculated value determined by direct calculation in the same manner as in the case of the conventional processing method for nonlinear optimization problems. The value of the search direction vector d may be replaced with the gradient vector to restart the search process as a case of k=0 that is defined in the expression (4).

For reasons that will be described later, such value replacement process can be performed after execution of a tracing back process of tracing back to the search step one step or several steps before the current step and then steps of the flowchart of FIG. 4 be resumed. The result of the judgment on whether or not to adopt the above approximate value or a directly calculated value determined for replacing the approximate value may be used as criteria for tracing back, based on which criteria the tracing back process and value replacement process are carried out.

Even if these value replacement and tracing back processes are carried out, the frequency of appearance of these processes in an experiment of the calculation method for a nonlinear optimum solution accounts for 10% of the whole calculation process. Approximate values calculated by approximation are thus adopted for 90% of the whole calculation process, so that the amount of calculation as a whole is reduced significantly. Compared to the case where the conventional calculation method for a nonlinear optimum solution is solely applied, therefore, the amount of calculation as a whole is reduced significantly, which allows fast calculation of the optimum solution. Applying the value replacement and tracing back processes realizes more stable optimum solution calculation.

(5) Example of Hardware Configuration of Processing System that Performs Nonlinear Optimization A hardware configuration of a processing system 1 according to the first embodiment, the processing system 1 optimizing parameters for a control simulation system, thus performing nonlinear optimization, will be described, referring to FIG. 5. The processing system 1 that performs nonlinear optimization uses the above processing method for nonlinear optimization problems. A control simulation system 10 generates control information for a control simulation, using the parameters optimized and outputted by the processing system 1. FIG. 5 depicts a hardware configuration for the embodiment, where the processing system is included in the same computer as that of the control simulation system.

In this example, the processing system 1 that performs nonlinear optimization includes a computer 11 having a processing unit (CPU) 12, an input device 13, an output device 14, and a processing program 16a and processing data 16b that are stored in a memory 15. The control simulation system 10 includes the computer 11 having the processing unit 12, the input device 13, the output device 14, and the measurement control program 17a, measurement control data 17b, the analysis program 18a, analysis data 18b, and control subject model data 19 that are stored in the memory 15. In this embodiment, the measurement control program 17a, measurement control data 17b, the analysis program 18a, analysis data 18b, and control subject model data 19 can be stored in a memory that is separate from the memory 15 and accessible from the CPU 12. This embodiment shows an example that a processing program 16a is stored in memory 15 as software which is different from the application program (measurement control program 17a). But the disclosure is not limited to this embodiment. For example, an application program itself may be configured to include a processing program 16a as a sub-routine. As used herein, the language computer processing unit or CPU is intended to encompass a single-core CPU, a multi-core CPU, one or more graphical processing units (GPU), a computer cluster, any other computer hardware that executes instructions, and combinations thereof. The CPU 12 and the memory 15 may be connected to the input device 13, output device 14, etc., via a network in a distributive system arrangement. Examples of the input device 13 can include, but are not limited to, a keyboard, mouse, controller, touch screen (for example of the electromagnetic induction type, electrostatic capacity type, pressure-sensitive type, infrared type, surface acoustic wave type, matrix switch type, etc.), other devices via which data can be input, and combinations thereof. Examples of the output device 14 can include, but are not limited to, a visual display such as a display screen, a projector, other devices via which data can be displayed, and combinations thereof.

Control subject model data 19 represents a state of a control subject model, such as shape, replacement, velocity, temperature, flow, pressure, voltage, etc. The analysis program 18a analyzes and simulates the state of the control subject model data 19 according to a change in the control information.

According to the processing system 1 that performs nonlinear optimization, the objective function f(x), the initial control variable $x_0$, and the convergence criterion ω that are subjected to the process indicated by the expression (2) are input to the processing system 1 through the input device 13, and are stored as the processing data 16b, in the memory 15. Subsequently, the processing program 16a stored in the memory 15 is executed. The processing program 16a calculates an optimum solution of the parameters that make the objective function the minimum or maximum, using an incoming measurement results from the measurement control program 17a and outputs the optimum solution to the measurement control program 17a. Measurement control program 17a receives the optimum solution from processing unit 12, generates control information based on the optimum solution, updates control over the control subject model data 19, based on the contents of the control information, and issues an analysis instruction to the analysis program 18a. The analysis program 18a then sends an analysis result back to the measurement control program 17a. By repeating the above process, optimum control parameters for the control subject model data 19 can be obtained.

According to the first embodiment, a processing program for optimizing control data for a control subject model is provided with a search means based on the processing method for nonlinear optimization problems. As a result, an optimum solution can be calculated as the number of times of differential calculations and functional calculations carried out at one search step is reduced to the minimum. This enables control simulation and numerical calculation faster than conventional control simulation and numerical calculation.

According to the line search method, the step size $\alpha$ can be calculated with precision bearing comparison with the precision of the conventional line search based on the parabolic interpolation method and the gradient at a critical point at each search step can be approximated. When a large-scale nonlinear optimization problem is processed, in particular, the calculation time T for the processing can be reduced significantly.

According to the processing method for nonlinear optimization problems, a functional value at a critical point at each search step can be approximated. As a result, the functional value at the critical point that must be calculated directly in the conventional case can be calculated recursively based on an already calculated value. Hence the calculation time T required for processing a nonlinear optimization problem can be reduced significantly.

Second Embodiment

Figure 6:
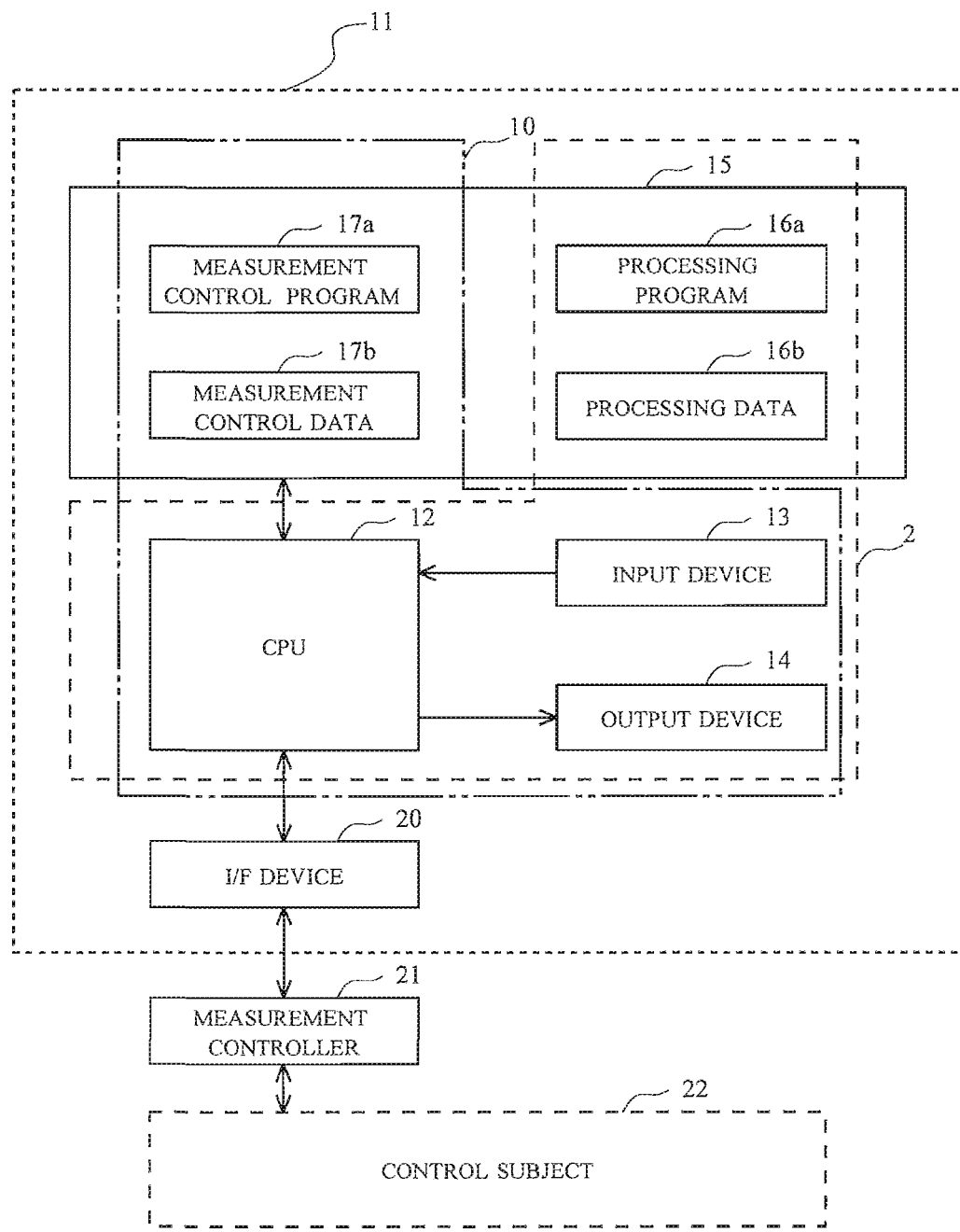
FIG. 6 depicts a hardware configuration of a processing system that performs nonlinear optimization according to a second embodiment.

A hardware configuration of a processing system 2 that optimizes parameters for a control system, thus performing nonlinear optimization will be described, referring to FIG. 6. The processing system 2 that performs nonlinear optimization uses the above described processing method for nonlinear optimization problems. A control system 10 generates control information for an automatic control, using the parameters optimized and outputted by the processing system 2. FIG. 6 depicts a hardware configuration for the embodiment, where the processing system is included in the same computer as that of the control system. Constituent elements basically the same as constituent elements described in the first embodiment are denoted by the same reference numerals and are therefore omitted in further description.

The processing system 2 that performs nonlinear optimization includes the computer 11 having the CPU 12, the input device 13, the output device 14, the memory 15, and the processing program 16a and the processing data 16b that are stored in the memory 15. The control system 10 that uses outputted value from the processing system 2 includes the computer 11 having the processing unit 12, the input device 13, the output device 14, and the measurement control program 17a and measurement control data 17b that are stored in the memory 15. The programs and data 16a-17b reside in suitable memory. In this embodiment, the measurement control program 17a, measurement control data 17b can be stored in a memory that is separate from the memory 15 and accessible from the CPU 12. This embodiment shows an example that a processing program 16a is stored in memory 15 as software which is different from the application program (control program 17a) or a part of operating system. But the disclosure is not limited to this embodiment. For example, an application program itself may be configured to include a processing program 16a as a sub-routine. The CPU 12 is connected to an I/F device 20 that acquires measurement results from and transmits the control information to a measurement controller 21. The measurement controller 21 controls a control subject 22 and receives a measurement input from a sensor (not shown in the figure). The memory 15 has the processing program 16a stored therein, which executes the above search means based on the processing method for nonlinear optimization problems according to the first embodiment. The CPU 12 and the memory 15 may be connected to the input device 13, output device 14, etc., via a network in a distributive system arrangement. The term "memory" used herein includes a computer-readable medium explained later.

According to the processing system 2 that performs nonlinear optimization, the objective function f(x), the initial control variable $x_0$, and the convergence criterion $\omega$, a measurement data for training, are stored as the processing data 16b, in the memory 15. Subsequently, the processing program 16a stored in the memory 15 is executed. The processing program 16a calculates an optimum solution of the parameters that make the objective function the minimum or maximum, using measurement results acquired from the I/F device 20 or stored in the processing data 16b, and outputs the optimum solution to the control system 10. The control system 10 receives the optimum solution from the processing unit 2, generates control information based on the optimum solution and a measurement input acquired through the I/F device 20, and transmits the information to the measurement controller 21 through the I/F device 20. Receiving the control information via the I/F device 20, the measurement controller 21 updates control over the control subject 22, based on the contents of the control information, and carries out measurement and transmits the measurement input to the I/F device 20. By repeating the above process, optimum control over the control subject 22 is realized. Because the control system 10 might have a high load of computation for a high-speed control demand, the components of the processing system 2 can be a separate hardware that outputs control information to the control system 10 via a memory or a network. The control subject 22 can be, but is not limited to, any device that is automatically controlled. In one example, the control subject 22 can be a pump device, gas-injecting device or a chemical-injecting device in a plant, or a robot on a production line in a factory. In another example, the control subject 22 can be an automobile, airplane or ship that can operate on automatic operation. Many other examples of control subjects 22 are possible.

In an example, computer 11 can be an automated driving control system of a car. The description hereinafter assumes that the term "automated driving" includes meaning of "semi-automated driving" and "autonomous driving". An automated driving is ranked in one of six levels, from 0 through 5. Fully automatic driving by machinery without human handling is required for the level above 2. Level 0 requires full human manipulation, including that with a warning and momentary assistance by machine. Level 1 and 2 requires limited human intervention. Level 3 through level 4 requires no human intervention, depending on situation and place. Level 5 requires no human intervention at any situation or place. The example described herein relates to an automated driving system of all the levels, and achieves an improvement of the automated driving by applying the invention of the disclosure.

Car manipulation includes steering, accelerating (including decelerating), and braking (including via the brakes, or via the engine) and an automated driving system replaces the human manipulation with an automatic control. In order to realize a safe, compliant, and efficient driving, the system must continuously take numerous and complicated information as inputs and recognizes, perceives, and judges the information to convert it into the appropriate outputs of the control signals. It is to be appreciated that braking via the engine may include modification to the acceleration, thereby accomplishing the engine braking.

The input information includes position, environment, and status of the car. The position information includes not only the information from the global positioning system (GPS) but also information converted from sensors for other purposes and enables determining precise position of the car. The environment information includes signals from a camera, a millimeter-wave radar, a Light Detection and Ranging (LIDAR) sensor, an ultra-sonic sensor, or the like, and enables not only detecting surrounding objects for safely evading the danger but also reading signs and tracing lanes for complying with rules. The status information includes steering angle, status of accelerator and brake, velocity, engine rotation, status of suspension and wheels, acceleration and angular velocity with respect to X, Y, and Z axes (roll, pitch, yaw) of the car. The status information enables not only monitoring status of the car but also evaluating safety of possible actions predicted from a planned driving control.

The sensors are used for not only each purpose but also for "sensor fusion", which combines the sensors to yield further useful information. For example, a vision from a camera may contain information about the curbs or lines of the road and enables compensating error of the positional information precisely. The visual information also can provide an optical flow, which is helpful to determine the motion of the car or objects in the vision.

The automated driving control system takes the inputs as the measurement results, recognizes and classifies the objects on and around the road, predicts motion of the objects, reads and interpret the signs, and predicts required control values such as steering angle, speed, and so on. Each of these processes accept complex information as the inputs and outputs appropriate information in a short period. One method to perform this control is using a neural network. The neural network can make an entire driving control system from the input to the output, known as end-to-end system, or make one or more parts of the driving control system. In any case, the parameters of the neural network determine the outputs of the automated driving control system. Therefore, the automated driving control system can be a neural network system (computer 11) that trains the parameters using measurement data (by processing system 2) and outputs the driving control data (by control system 10 via I/F device 20) to a driving controller (measurement controller 21) that controls a vehicle (control subject 22) according to the parameters and current measurement input data. The training is achieved by optimizing the parameters of the neural network; i.e. a nonlinear optimization. The vehicle can be an electric vehicle or a vehicle having an internal combustion engine. The vehicle further can be not only a car that runs on the roads, but also a car that carries a thing or human in a factory or storage.

Third Embodiment

Figure 7:
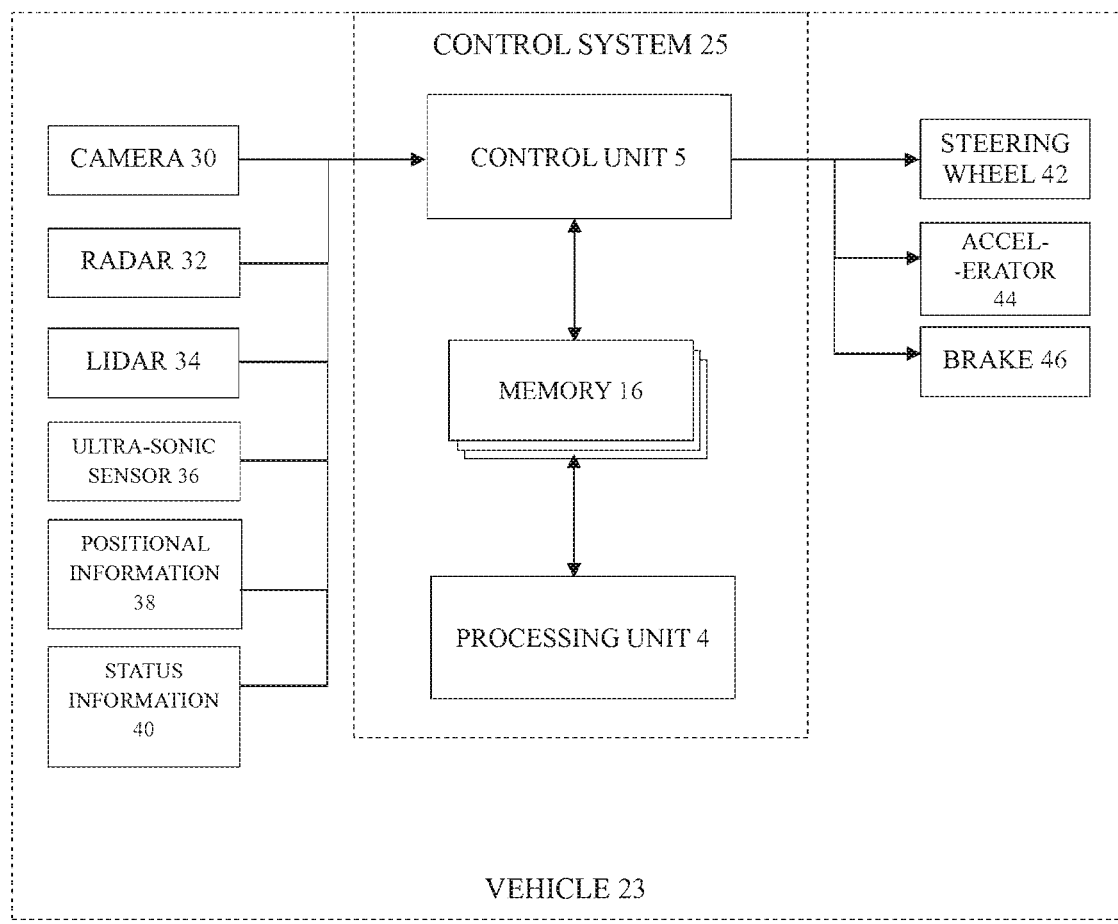
FIG. 7 depicts a hardware configuration of a processing system that performs nonlinear optimization according to a third embodiment.

A hardware configuration of the processing system 2 that performs nonlinear optimization will be described referring to FIG. 7. Relative to the processing system 2 and the control system 10 in the second embodiment that controls the control subject 22 in FIG. 6, the processing system 2 and the control system 10 are in separate hardware comprising a control system 25 in the embodiment of FIG. 7. Constituent elements of the third embodiment that are basically the same as constituent elements described in the second embodiment are denoted by the same reference numerals and are therefore omitted in further description. The processing system 2 and the control system 10 in FIG. 6 reside in the processing unit 4 and the control unit 5 respectively in FIG. 7. Respective hardware components, the input device 13, the output device 14, the CPU 12, and the memory 15 are included in each of the processing unit 4 and the control unit 5. The control unit 5 further includes the I/F device 20 and the measurement controller 21. The control subject 22 is specified as a vehicle 23 that has sensors 30-40 as the input of the control unit 5 and manipulating devices 42-46 controlled by the control unit 5. The vehicle 23 can be any vehicle including at least three wheels, such as, but not limited to, an automobile, a bus, a semi-truck, or the like. The sensors 30-40 include a camera 30, radar 32, LIDAR 34, ultra-sonic sensor 36, and sensors 38, 40 providing positional information and status information. The manipulating devices 42-46 include a steering wheel 42, accelerator 44, and brake 46. The processing unit 4 and the control unit 5 communicate via the memory 16. The memory 16 can be in a separate hardware or a part of the processing unit 4 or the control unit 5. The memory 16 can function as a buffer that stores the input measurement data or the parameters to adjust timing to update the information. The processing system 2 and the control system 10 included in each computer unit perform in the same way as described above.

According to the second embodiment and the third embodiment, a processing program is provided with a search means based on the processing method for nonlinear optimization problems. As a result, an optimum solution can be calculated as the number of times of differential calculations and functional calculations carried out at one search step is reduced to the minimum. This enables machine control faster than conventional machine control.

Fourth Embodiment

Figure 8:
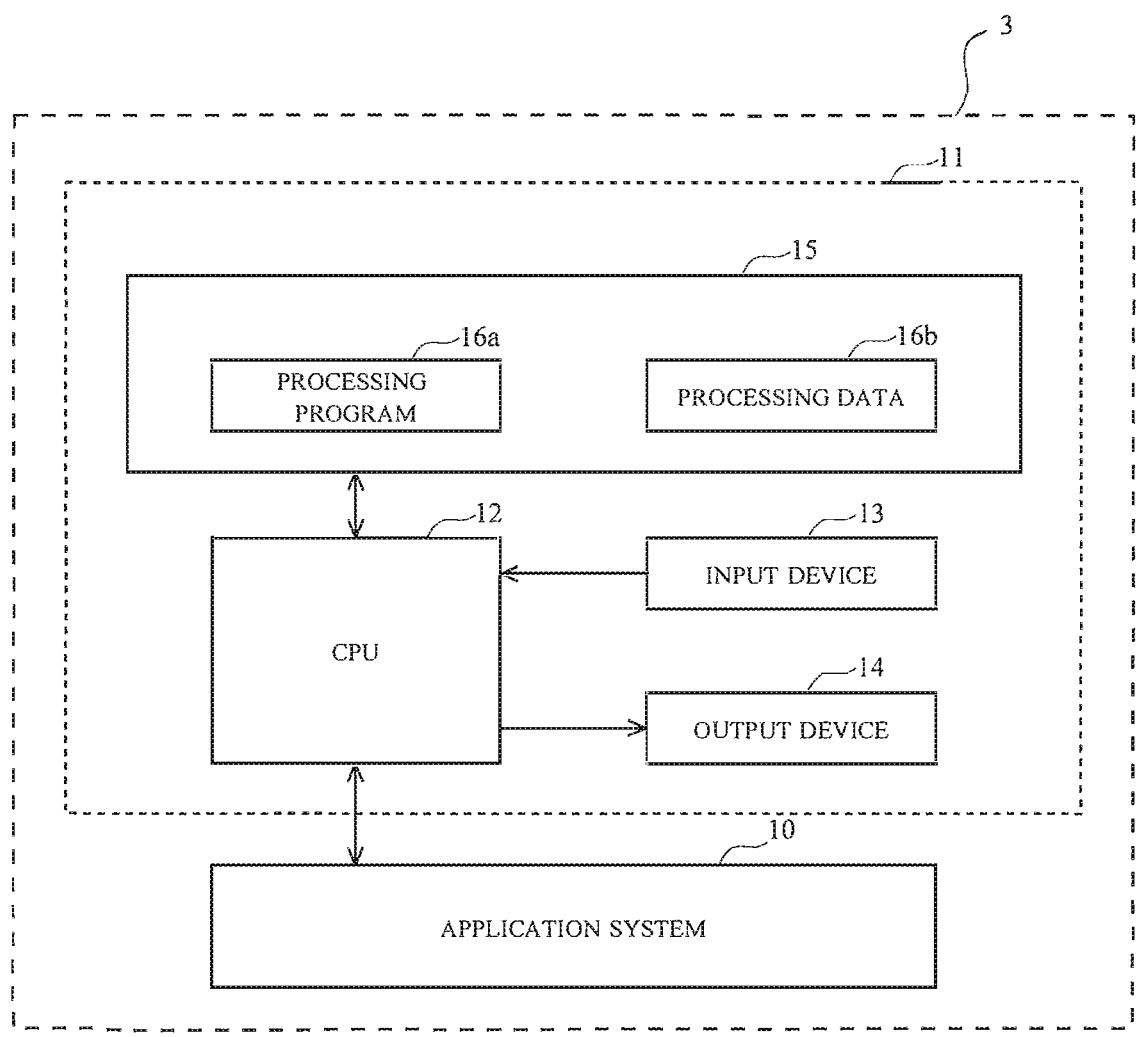
FIG. 8 depicts a hardware configuration of a processing system that performs nonlinear optimization according to a fourth embodiment described herein.

A hardware configuration of another embodiment of a processing system 3 that performs nonlinear optimization is illustrated in FIG. 8. The processing system 3 uses the above described processing method for nonlinear optimization problems. Constituent elements basically the same as constituent elements described in the first, second, and third embodiments are denoted by the same reference numerals and are therefore omitted in further description.

The processing system 3 includes the CPU 12, the input device 13, the output device 14, the memory 15, the processing program 16a, the processing data 16b, and an application system 10 that use outputted value from the CPU 12. The processing program 16a and processing data 16b are stored in the memory 15. The programs and data for processing system 3 and application system 10 reside in suitable memory. In this embodiment, the CPU 12 can be part of a computer that is separate from the memory 15. In this embodiment, the application system 10 can be separate from a computer 11. Alternatively, the application system 10 can be part of the same computer (computer 11) containing the CPU 12.

An application system 10 can be any system that can utilize the output x from the CPU 12. For example, the application system 10 can be a control simulation system, a solver system, a machine learning system, an artificial neural network, a recognition system, a forecasting system, an automatic operation system, an automatic driving system, a control system, or any other system described or contemplated herein that can utilize the output x from the CPU 12.

According to the line search method, the step size α can be calculated with precision bearing comparison with the precision of the conventional line search based on the parabolic interpolation method and a gradient at a critical point at each search step can be approximated. When a large-scale nonlinear optimization problem is processed, in particular, the calculation time T for the processing can be reduced significantly.

According to the processing method for nonlinear optimization problems, a functional value at a critical point at each search step can be approximated. As a result, the functional value at the critical point that must be calculated directly in the conventional case can be calculated recursively based on an already calculated value. Hence the calculation time T required for processing a nonlinear optimization problem can be reduced significantly.

The embodiments described herein provide a processing system such as solver system such as numerical analysis system, operations research system, structural calculation system, design simulation system and analysis system of fluid, heat, electromagnetic waves, etc., and many other computer systems such as control system, and a processing program that perform solver algorithms, machine learning methods, supervised learning methods for artificial neural networks, numerical analysis, operations research, structural calculation, design, simulation, and analyses of fluid, heat, electromagnetic waves, etc. with a processing speed improved to be significantly higher than a processing speed in the conventional case.

The embodiments described herein can be implemented in machine learning systems including, but not limited to, artificial neural networks; and applications that are implemented in conjunction with machine learning systems and/or artificial neural networks such as face recognition systems, automatic operation systems including, but not limited to, an automatic pilot system of an aircraft, an automatic driving system of an automobile, an automatic piloting system of a ship, and other automatic operation systems, demand forecasting systems used to predict future demand for a product and/or service, and the like.

Embodiments also include computer program products for performing various operations disclosed herein. The computer program products comprises program code that may be embodied on a computer-readable medium, such as, but not limited to, any type of disk including hard disks, floppy disks, optical disks, CD-ROMs, magnetic-optical disks, read-only memories (ROMs), random access memories (RAMs), EPROMs, EEPROMs, flash memory, magnetic or optical cards, application specific integrated circuits (ASICs), or any type of media suitable for storing electronic instructions. One or more parts of the program code may be distributed as part of an appliance, downloaded, and/or otherwise provided to a user.

The invention claimed is:

1. A method for controlling an automated vehicle including at least one of a camera, a radar, a LIDAR, or an ultra-sonic sensor, the method comprising:
   a computer processing unit that executes a nonlinear optimization routine, and a computer control unit that controls the automated vehicle,
   wherein the computer processing unit executes a plurality of search steps to improve a vector x so that x minimizes or maximizes a value of a function of x, f(x), each search step includes:
   a) assigning a vector g a gradient of f(x);
   b) using g to determine a search direction vector, changing x by using the determined search direction vector, and determining a gradient of f(x);
   c) using g and the gradient determined in b) to determine a step size, approximating a gradient of f(x) by using g, the determined gradient in b), and the determined step size, wherein x is determined by using the determined search direction vector and the step size, and determining if a convergence condition is satisfied;
   d) if the convergence condition is not satisfied, assigning the approximated gradient of f(x) to g and returning to step b);
   e) if the convergence condition is satisfied, outputting x determined by using the determined search direction vector and the step size to the computer control unit;
   receiving, by the computer control unit:
      the output x from the computer processing unit, and
      an input from the at least one of the camera, the radar, the LIDAR, or the ultra-sonic sensor, converting, by the computer control unit, x and
   the input into a control signal, and
      controlling the automated vehicle using the control signal by controlling at least one of steering, acceleration, and braking of the automated vehicle.

2. The method of claim 1, wherein the computer processing unit comprises computer hardware that executes programmed instructions.

3. The method of claim 1, wherein the computer processing unit comprises one or more of a single core central processing unit, a multi-core processing unit, a graphical processing unit, and a computer cluster.

4. A control system that processes input from at least one of a camera, a radar, a LIDAR, or an ultra-sonic sensor, comprising:
   a computer processing unit that performs nonlinear optimization with increased processing speed, and a computer control unit that controls an automated vehicle,
   wherein the computer processing unit has memory storing therein a nonlinear optimization program that is executed by the computer processing unit,
   the computer processing unit executes a plurality of search steps to improve a vector x so that x minimizes or maximizes a value of a function of x, f(x), each search step includes:
   a) assigning a vector g a gradient of f(x);
   b) using g to determine a search direction vector, changing x by using the determined search direction vector, and determining a gradient of f(x);
   c) using g and the gradient determined in b) to determine a step size, approximating a gradient of f(x) by using g, the determined gradient in b), and the determined step size, wherein x is determined by using the determined search direction vector and the step size, and determining if a convergence condition is satisfied;
   d) if the convergence condition is not satisfied, assigning the approximated gradient of f(x) to g and returning to step b);
   e) if the convergence condition is satisfied, outputting x determined by using the determined search direction vector and the step size to the computer control unit;
   the computer control unit receives:
      the output x from the processing unit, and
      the input from the at least one of the camera, the radar, the LIDAR, or the ultra-sonic sensor,
   the computer control unit converts x and the input into a control signal, and controls the automated vehicle using the control signal by controlling at least one of steering, acceleration, and braking of the automated vehicle.

5. The processing system of claim 4, wherein the computer processing unit comprises computer hardware that executes programmed instructions.

6. The processing system of claim 4, wherein the computer processing unit comprises one or more of a single core central processing unit, a multi-core processing unit, a graphical processing unit, and a computer cluster.

7. A non-transitory computer readable medium having recorded thereon a nonlinear optimization program that is executable by a computer processing unit of a control system that processes input from at least one of a camera, a radar, a LIDAR, or an ultra-sonic sensor and has a computer control unit that controls an automated vehicle, for causing the computer processing unit to execute a plurality of search steps to improve a vector x so that x minimizes or maximizes a value of a function of x, f(x), where each search step includes:
  a) assigning a vector g a gradient of f(x);
  b) using g to determine a search direction vector, changing x by using the determined search direction vector, and determining a gradient of f(x);
  c) using g and the gradient determined in b) to determine a step size, approximating a gradient of f(x) by using g, the determined gradient in b), and the determined step size, wherein x is determined by using the determined search direction vector and the step size, and determining if a convergence condition is satisfied;
  d) if the convergence condition is not satisfied, assigning the approximated gradient of f(x) to g and returning to step b);
  e) if the convergence condition is satisfied, outputting x determined by using the determined search direction vector and the step size to the computer control unit;

wherein the computer control unit receives the output x from the processing unit and the input from the at least one of the camera, the radar, the LIDAR, or the ultra-sonic sensor, to convert x and the input into a control signal, and to control the automated vehicle by controlling at least one of steering, acceleration, and braking of the automated vehicle.

8. The non-transitory computer readable medium of claim 7, wherein the computer processing unit comprises computer hardware that executes programmed instructions.

9. The non-transitory computer readable medium of claim 7, wherein the computer processing unit comprises one or more of a single core central processing unit, a multi-core processing unit, a graphical processing unit, and a computer cluster.

10. A control system for automated control of an automated vehicle, the vehicle including at least one sensor and at least one manipulating device, the at least one sensor including a camera, radar, LIDAR, an ultra-sonic sensor, a positional information sensor, or a status information sensor and the at least one manipulating device including a steering wheel, an accelerator, and a brake, the control system comprising:
  a computer control unit and a computer processing unit, wherein the computer processing unit is configured to perform a non-linear optimization to improve a vector x by means of a quadratic approximation with one gradient calculation per step, the improved vector x being an output of the non-linear optimization; and the improved vector x and an input received from the at least sensor being used to generate a control signal for the at least one manipulating device; and to control the at least one manipulating device by automatically changing a status of the steering, the accelerator, or the brake.

* * * * *